United States Patent Office 3,528,943
Patented Sept. 15, 1970

3,528,943
ADHESIVE COMPOSITIONS AND METHOD
FOR BONDING ELASTOMERS
Gerald Goldberg, Parkersburg, and Richard W. Czerwinski and Herschel G. Thomas, Jr., Washington, W. Va., assignors, by mesne assignments, to Lord Corporation, Erie, Pa., a corporation of Pennsylvania
No Drawing. Filed Sept. 5, 1967, Ser. No. 665,257
Int. Cl. C08f 45/08, 27/06; C08j 3/14
U.S. Cl. 260—41       4 Claims

ABSTRACT OF THE DISCLOSURE

A composition for bonding elastomeric materials to a variety of substrates comprised of a halogenated ethylene-propylene copolymer and from 15–35 percent by weight sulfur, said sulfur based on the total solids content of said composition and a method of bonding α-olefin hydrocarbon copolymers to substrates such as leather, textiles, rubbers, metals and the like.

BACKGROUND

Prior to this invention, a great variety of adhesive compositions were utilized in the bonding of elastomeric materials either to themselves or to other substrates to form laminates and composite articles. Many of the prior adhesives were lacking in versatility and, though useful in bonding specific elastomers to specific substrates, were not capable of being utilized with some of the more recently prepared copolymer elastomers such as the α-olefin hydrocarbon elastomers.

It has always been extraordinarily difficult to bond the α-olefin hydrocarbon copolymers such as ethylene-propylene copolymers to substrates such as leather, textiles, rubber, metals, e.g., iron, steel, copper, brass, aluminum and the like. The difficulty in bonding the ethylene-propylene copolymers is due, in part, to its sensitivity to vulcanization and loss of bond strength through vulcanization. In view of the fact that ethylene-propylene copolymers are becoming increasingly more important in industry due to their utility in a great variety of products, it has been considered desirable to find an adhesive composition capable of bonding this specific group of elastomeric copolymers to given substrates. The majority of the prior art adhesives that were utilized to bond the α-olefin hydrocarbon copolymers were found unsatisfactory due to their relatively inferior peel strengths as well as the necessity of providing interlayers between the substrate and the α-olefin hydrocarbon copolymer.

It has been proposed to utilize several layers of adhesives, one of which is used to provide a strong bond to the metal and a second layer of adhesive to provide a strong bond for the α-olefin hydrocarbon copolymer. Utilizing this adhesive system, it is, of course, necessary to provide an intermediate layer which will provide a bond between the rubber adhesive and the metal adhesive. One of the more recent methods is described in Canadian Pat. 729,596 issued to Gladding et al., which utilizes an adhesive layer of chlorosulfonated polyethylene, a second layer of cured rubber such as Neoprene as an interlayer, and a third adhesive composition to provide an interlayer of rubber to metal bond which consists of a polyisocyanate and/or a polychlorinated natural rubber. It will be noted that this system is cumbersome, and requires several applications, i.e., at least three applications prior to providing the bond between the copolymer and the metal.

SUMMARY OF THE INVENTION

The present invention is directed to the bonding of α-olefin hydrocarbon copolymers to substrates such as leather, textile, rubber and particularly the bonding of these elastomers to metal. The present invention provides a bonding method as well as an adhesive composition comprised of a halogenated (chlorinated brominated) ethylene-propylene copolymer which may be used as a rubber layer or in a solvent solution, i.e., dissolved in a suitable solvent such as xylene, toluene, carbon tetrachloride or the like. The adhesive compositions also contains fillers, such as carbon black, hydrated silica and the like and from 15–35 percent by weight sulfur.

As mentioned, the adhesive composition of the present invention is specifically useful in bonding α-olefin hydrocarbon copolymers to metal substrates. When the adhesive compositions of the instant invetnion are utilized to bond the α-olefin hydrocarbon copolymers to metal and specifically the α-monoolefin-non-conjugated hydrocarbon diene copolymers to metal, they may also be used in conjunction with a conventional rubber to metal adhesive, which provides a base primer coat on the metal. The normally solid α-olefin hydrocarbon copolymers are those copolymers containing at least two α-monoolefins or at least one α-monoolefins and at least one non-conjugated hydrocarbon diene. The α-monoolefins have the structure R—CH=CH$_2$ wherein R is a hydrogen or an alkyl group containing one to sixteen carbon atoms.

Examples of useful α-monoolefins having the structure R—CH=CH$_2$ include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1 hexene; 5,6,6-trimethyl-1-heptene; 1-dodecene.

Examples of copolymers made from these monoolefins and the non-conjugated dienes and their preparation are described in U.S. Pats. 2,933,480 and 3,000,866. The preferred copolymers are ethylene-propylene; ethylene-propylene-dicyclopentadiene; ethylene-1,4-hexadiene; ethylene-propylene-1,4-hexadiene. The copolymers containing from 30–70 percent ethylene and 30–70 percent propylene and up to about 5 weight percent 1,4-hexadiene or dicyclopentadiene are particularly preferred.

The adhesive compositions utilized to bond the aforementioned elastomers including the α-olefin hydrocarbon copolymers are primarily comprised of halogenated ethylene-propylene rubber prepared by halogenating ethylene-propylene copolymer rubbers to contain from about 20 to 35 percent halogen. The halogen may be either bromine or chlorine and is preferably chlorine. Also, there is about 10–50 percent by weight of a filler such as carbon black or hydrated silica and about 15–35 percent by weight of sulfur added to the adhesive composition. If the halogenated ethylene-propylene rubber adhesive compositions are utilized as solvent solutions, they are prepared by dissolving the halogenated ethylene-propylene copolymer in a suitable solvent such as xylene, toluene, carbon tetrochloride or the like and dispersing the other additive uniformly throughout the solution. There are many solvents that are useful to prepare the desired solids content and those mentioned are meant to be illustrative and not restrictive.

Sulfur and fillers, such as carbon black, hydrated silica and the like may be added in amounts exceeding 60 percent by weight of the total solids composition and the amount of the fillers is limited only by the problems encountered with the extremely viscous solutions. Other additives, such as antioxidants, can also be included in the composition.

As mentioned, if it is desired to apply an adhesive as a liquid, the composition may be prepared by conventional agitation procedures such as by blending on a ball mill to obtain a solids content of from about 3 to about 20 percent by weight. Lower or higher solids content may also be used and the solids content is not critical. The mixing of the adhesive composition may take place at room temperature, however, higher temperatures may be employed to reduce the viscosity and accelerate the mixing.

The adhesive compositions of this invention are used in multiple coating systems to provide a good bond between α-olefin hydrocarbon copolymers and metal, as well as various other substrates. In the examples set forth hereinbelow, certain test procedures were utilized for evaluating the adhesive properties when the adhesive was applied to bond an α-olefin hydrocarbon copolymer to a metal substrate. In the preparation of the testing of the adhesives, metal strips were degreased by exposing the strips to the vapors of boiling trichloroethylene, sandblasted with 80 mesh sand, rinsed with water and degreased a second time. In each case, the strips thus prepared were coated with an adhesive of chlorinated natural rubber prepared by making up a solution of chlorinated natural rubber in xylene (5 percent rubber). The adhesive coated strips were air-dried for thirty minutes and top coated with an adhesive prepared in accordance with this invention. The adhesives utilized in accordance with this invention are either chlorinated or brominated ethylene-propylene rubbers or chlorinated or brominated ethylene-propylene—non-conjugated diene rubbers. The amount of carbon black and sulfur utilized in compounding the adhesive is set forth in the specific examples.

After being coated, the strips were placed in the compression mold and overlaid with rubber. The strips and rubber were normally compression molded under conditions to adequately vulcanize the rubber stock. The individually bonded strips were conditioned at 73° F. at 60 percent relative humidity for 8–16 hours and peeled at an angle of 90° using ASTM Test D–429–64 (Method B). The values reported were the maximum forces required to peel the rubber from the metal in pounds per linear inch of width. Failure was observed either in the rubber or at one of the interfaces between the rubber and substrate.

The basic rubber stock composition utilized in bonding to steel is set forth in the following recipe, which rubber stock was used in Examples 1 through 8.

|  | Parts by weight |
|---|---|
| Ethylene-propylene-non-conjugated diene rubber | 100 |
| Zinc oxide | 5 |
| Carbon black | 80 |
| Process oil | 40 |
| Sulfur | 1.5 |
| Mercaptobenzothiazole | .5 |
| Tetramethylthiuram monosulfide | 1.5 |
| Stearic acid | 0.5 |

An ethylene-propylene copolymer rubber adhesive formulation containing 28 percent chlorine was tested in bonding the rubber stock of the recipe above the differing amounts of sulfur along with carbon black in the formulation, and the results are shown in Examples 1 through 8 of Table 1. In the testing of the compositions, the procedure set forth above was followed.

TABLE 1

| Example | 1 | 2 | 3 | 4 | 5 | 6 | 7 | 8 |
|---|---|---|---|---|---|---|---|---|
| 28% Cl-EPR | 100 | 100 | 100 | 100 | 100 | 100 | 100 | 100 |
| Carbon black | 50 | 50 | 50 | 50 | 50 | 50 | 50 | 50 |
| Sulfur | 0 | 20 | 30 | 40 | 50 | 60 | 70 | 80 |
| Xylene | 1,000 | 1,000 | 1,000 | 1,000 | 1,000 | 1,000 | 1,000 | 1,000 |
| 90° peel adhesion: | | | | | | | | |
| P.l.i. | 58 | 70 | 99 | 95 | 118 | 122 | 87 | 64 |
| Percent rubber failure | 1 | 4 | 73 | 63 | 100 | 93 | 40 | 12 |

All other failure—at rubber-cover cement interface.

Example 1 serves as the control for Examples 2 through 8 in that there is no sulfur in Example 1. It will be noted that the bond strength is substantially improved with the addition of sulfur.

In the examples set forth in Table 2, the effect of blending ethylene-propylene non-conjugated diene copolymer rubbers with various other rubber stocks is set forth as well as the bonding of these blends with the adhesive prepared from 100 parts of 28 percent chlorinated ethylene-propylene rubber, 50 parts carbon black, 50 parts sulfur and 1000 parts of xylene.

TABLE 2

| Example | 9 | 10 | 11 | 12 | 13 | 14 | 15 | 16 | 17 |
|---|---|---|---|---|---|---|---|---|---|
| EPDN [1] | 100 | 100 | 100 | 100 | 100 | 100 | 100 | 100 | 100 |
| Butyl rubber | | 20 | 50 | 100 | | | | | |
| Chlorosulfonated polyethylene | | | | | 5.0 | 10 | | | |
| Polychloroprene | | | | | | | 10 | 20 | 30 |
| Zinc oxide | 5.0 | 6.0 | 7.5 | 10 | 5.0 | 5.0 | 5.0 | 6.0 | 6.8 |
| Stearic acid | 0.5 | 0.6 | 0.75 | 1.0 | 0.5 | 0.5 | 0.5 | 0.6 | 0.68 |
| Process oil | 40 | 48 | 60 | 80 | 42 | 44 | 42 | 48 | 58 |
| Carbon black | 80 | 96 | 120 | 160 | 84 | 88 | 84 | 96 | 105 |
| Sulfur | 1.5 | 1.8 | 2.25 | 3.0 | 1.6 | 1.7 | 1.6 | 1.8 | 2.0 |
| Mercaptobenzothiazole | 0.5 | 0.6 | 0.75 | 1.0 | 0.6 | 0.6 | 0.1 | 0.6 | 0.68 |
| Tetramethylthiuram monosulfide | 1.5 | 1.8 | 2.25 | 3.0 | 1.6 | 1.7 | 1.6 | 1.8 | 2.0 |
| 90° peel adhesion: | | | | | | | | | |
| P.l.i. | 116 | 113 | 118 | 102 | 108 | 119 | 127 | 128 | 127 |
| Percent rubber failure | 100 | 100 | 100 | 100 | 100 | 100 | 100 | 100 | 100 |

[1] Ethylene-Propylene-non-conjugated diene copolymer.

In Examples 18 and 19 set forth hereinbelow, the adhesive composition utilized in Examples 9 through 17 was also used to bond butyl rubber and polychloroprene rubber stocks to steel using the test procedures for the previously set forth examples.

TABLE 3

|  | 18 | 19 |
|---|---|---|
| Butyl rubber: | | |
| P.l.i. | 67 | |
| Percent rubber failure | 90 | |
| Polychloroprene: | | |
| P.l.i. | | 118 |
| Percent rubber failure | | 100 |

EXAMPLE 20

Utilizing the test procedure set forth for the previous examples, the same adhesive composition was coated on aluminum and brass strips and ethylene-propylene rubber stock was bonded thereto with 100 percent rubber failure.

Utilizing the same composition set forth above, a variety of rubber stocks were bonded to steel strips and the adhesion strengths are shown in the examples set forth in Table 4 below.

TABLE 4

| Example | 21 | 22 | 23 |
|---|---|---|---|
| Rubber stock | Butyl | SBR | Natural |
| Adhesion, p.l.i | 60 | 63 | 34 |

The examples of Table 5 below demonstrate the effect of differing degrees of halogenation in the halogenated rubber using the basic rubber stock of Examples 1 through 8 as well as the test procedure outlined above.

TABLE 5

| Example | 24 | 25 | 26 | 27 | 28 |
|---|---|---|---|---|---|
| 18.9% Cl in Cl-EPR | 10 | | | | |
| 26% Cl in Cl-EPR | | 10 | | | |
| 28% Cl in Cl-EPR | | | 10 | | |
| 29% Cl in Cl-EPR | | | | 10 | |
| 32% Cl in Cl-EPR | | | | | 10 |
| Carbon black | 5 | 3 | 10 | 1 | 5 |
| Sulfur | 5 | 3 | 3 | 1 | 5 |
| Toluene | 63 | 55 | | 55 | 100 |
| Xylene | 50 | 45 | 150 | 45 | |
| 90° peel adhesion: | | | | | |
| P.l.i | 24 | 109 | 115 | 87 | 109 |
| Percent rubber failure | 0 | 100 | 100 | 80 | 100 |

Other halogens, e.g., bromine, may be used in the halogenated rubber of the adhesive. Table 6 below sets forth the use of brominated EPR in the adhesive of this invention, using the rubber composition of Examples 1–8. The test procedure was the same as for the previous examples.

TABLE 6

| Example | 29 | 30 |
|---|---|---|
| 19.7% Br in Br-EPR | 10 | |
| 26.3% Br in Br-EPR | | 10 |
| Carbon black | 5 | 5 |
| Sulfur | 5 | 5 |
| Xylene | 120 | 120 |
| 90° peel adhesion, p.l.i | 31 | 55 |

Table 7 below shows the effect of eliminating filler or hydrated silica from the basic ethylene-propylene-non-conjugated diene formulation of Examples 1–8.

TABLE 7

| Example | 31 | 32 | 33 |
|---|---|---|---|
| 28% Cl-EPR | 10 | 10 | 10 |
| Precipitated hydrated silica | | 1.7 | 3 |
| Sulfur | 2 | 2 | 2 |
| Xylene | 120 | 130 | 140 |
| 90° peel adhesion: | | | |
| P.l.i | 55 | 89 | 85 |
| Percent rubber failure | 3 | 60 | 45 |

The examples above have illustrated the invention as applied to the bonding of various elastomers to metal, however, as indicated, the adhesives of this invention may also be used to bond elastomers to themselves as well as to other substrates. The ethylene-propylene non-conjugated diene copolymer were bonded to graft copolymers under conditions of heat and pressure and the resulting bond was sufficient to cause some copolymer tearing when separated. Cured ethylenepropylene—non-conjugated diene copolymer was also bonded to itself under similar conditions with excellent adhesion with mostly rubber tearing. Ethylene-propylene—non-conjugated diene copolymer, both cured and uncured, was also bonded to uncured neoprene, uncured butyl rubber and nylon fabric under similar conditions with excellent bonding and with the rubber tearing in each case. Thus, the adhesive compositions of the present invention are extraordinarily effective bonding agents for bonding rubber to metal as well as to other substrates.

Though the invention has been described in connection with certain specific embodiments, it should be understood that this is by way of illustration and not by way of limitation and that the scope of the invention is defined solely by the appended claims, which should be construed as broadly as is consistent with the prior art.

What is claimed is:

1. An adhesive composition consisting essentially of a halogenated ethylene-propylene copolymer and from 15–35 percent by weight sulfur, said sulfur based on the total solids content of said adhesive composition, in a solvent capable of dissolving said copolymer.

2. An adhesive composition consisting essentially of a halogenated ethylene-propylene copolymer and about 15 to about 35 percent by weight sulfur, said sulfur based on the total solids content of said adhesive composition, in a solvent capable of dissolving said copolymer wherein the copolymer is halogenated so as to contain from about 20 percent to about 35 percent halogen and said halogen is selected from the group consisting of chlorine and bromine.

3. The adhesive composition of claim 2 wherein said adhesive composition contains carbon black.

4. The adhesive composition of claim 2 wherein said composition contains from about 10 percent by weight to about 50 percent by weight of filler selected from the group consisting of carbon black, hydrated silica and the like, said filler based on the total solids content of said adhesive composition.

References Cited

UNITED STATES PATENTS

| 3,049,455 | 8/1962 | Werkman et al. | 154—43 |
| 3,062,795 | 11/1962 | Cain et al. | 260—88.2 |
| 3,450,667 | 6/1969 | Kopocki | 260—41 |

MORRIS LIEBMAN, Primary Examiner

J. H. DERRINGTON, Assistant Examiner

U.S. Cl. X.R.

156—333; 161—216, 242, 253; 260—33.6, 33.8, 41, 41.5, 79.5, 88.2